INVENTOR.
ALVA K. HINCHMAN
BY
ATTORNEY.

Oct. 3, 1961 A. K. HINCHMAN 3,002,703
MOTION PICTURE FILM WINDER AND EDITOR
Filed Aug. 8, 1958 4 Sheets-Sheet 2

INVENTOR.
ALVA K. HINCHMAN
BY Robert K. Youtee
ATTORNEY.

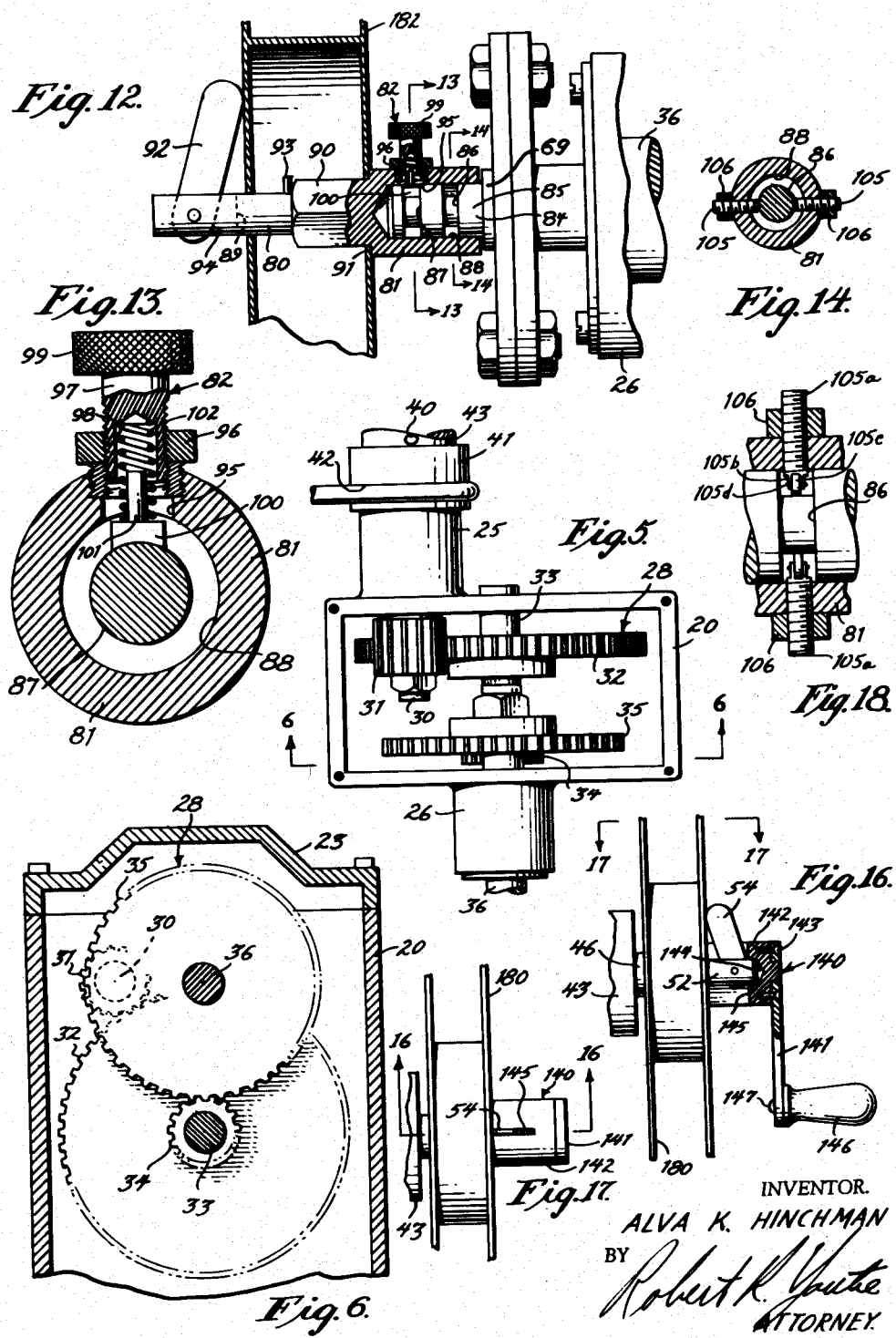

Oct. 3, 1961 A. K. HINCHMAN 3,002,703
MOTION PICTURE FILM WINDER AND EDITOR
Filed Aug. 8, 1958 4 Sheets-Sheet 4

INVENTOR.
ALVA K. HINCHMAN
BY
ATTORNEY.

United States Patent Office 3,002,703
Patented Oct. 3, 1961

3,002,703
MOTION PICTURE FILM WINDER AND EDITOR
Alva K. Hinchman, 2 Rugby Road, Bryn Mawr, Pa.
Filed Aug. 8, 1958, Ser. No. 753,906
3 Claims. (Cl. 242—55.12)

The invention relates generally to devices for operating upon motion-picture film, and is especially adapted for use in the editing of motion-picture film, including cutting, splicing and the like, and also for use in the rapid rewinding of motion-picture film. This application is a continuation in part of my prior co-pending patent application Serial Number 680,482, filed August 27, 1957, now Patent No. 2,946,531.

As stated in said co-pending patent application, substantially different operating requirements must be met for satisfactory film winding and editing, especially as regards the range of film speed and the degree of control over film movement.

It is therefore one object of the present invention to provide a device for use in editing and winding of motion-picture film which provides increased versatility in such operations, and completely satisfies all desiderata thereof.

It is a further object of the present invention to provide a motion-picture film editing and winding device of the character indicated which is staunch and durable in construction, entirely safe and reliable in operation, and which can be manufactured, sold and maintained at reasonable costs.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

FIGURE 5 is a sectional horizontal view taken substantially along the line 5—5 of FIGURE 2;

FIGURE 6 is a sectional elevational view taken substantially along the line 6—6 of FIGURE 5;

FIGURE 12 is a partial, horizontal sectional view taken substantially along the line 12—12 of FIGURE 2;

FIGURE 13 is a sectional elevational view taken substantially along the line 13—13 of FIGURE 12;

FIGURE 14 is a sectional elevational view taken substantially along the line 14—14 of FIGURE 12;

FIGURE 16 is a partial elevational view showing one projecting shaft of the instant apparatus, illustrating a manual drive means therefor, and partly in section to facilitate understanding, as along the line 16—16 of FIGURE 17; and FIGURE 17 is a view showing the elements of FIGURE 16 taken in the direction of the arrows 17—17 of FIGURE 16;

FIGURE 18 is a partial sectional view in the region of line 14—14 in FIGURE 12, but taken along a plane normal to the latter and showing a slightly modified form of structure;

Figure 1:
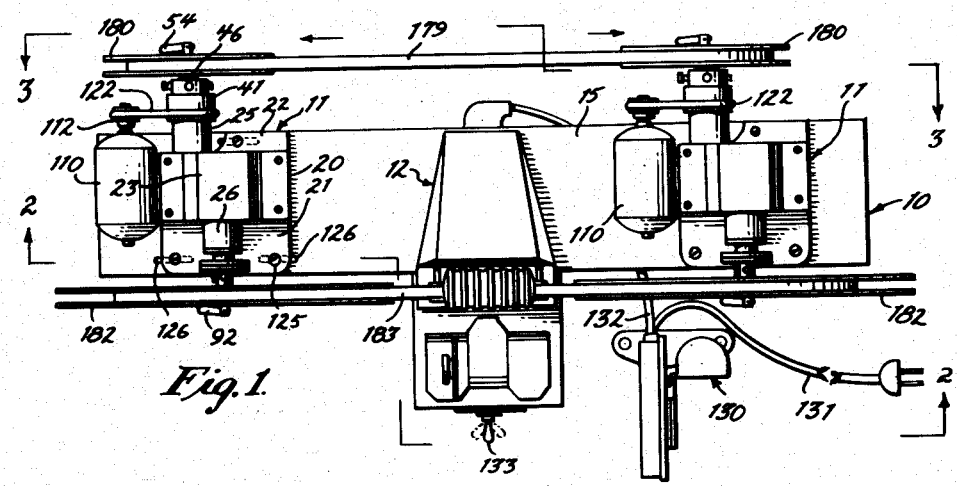
FIGURE 1 is a top plan view showing a film winding and editoring device constructed in accordance with the teachings of the present invention.
Figure 2:
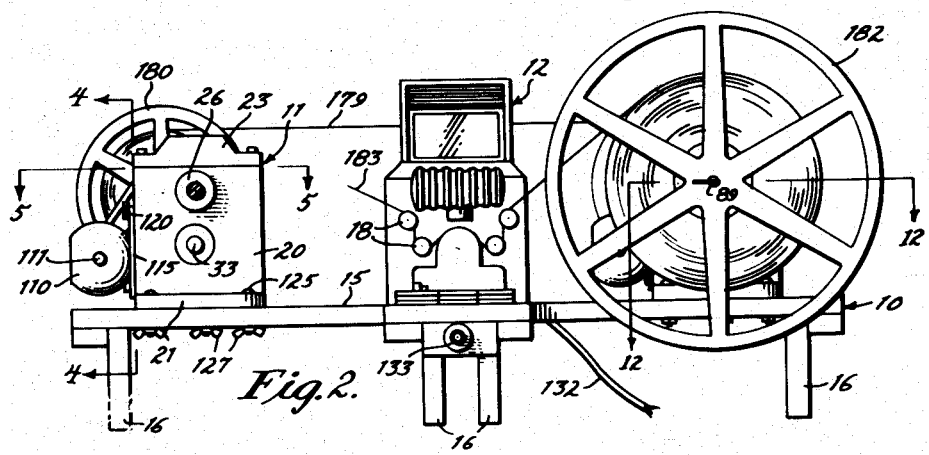
FIGURE 2 is a sectional elevational view taken substantially along the line 2—2 of FIGURE 1.
Figure 3:
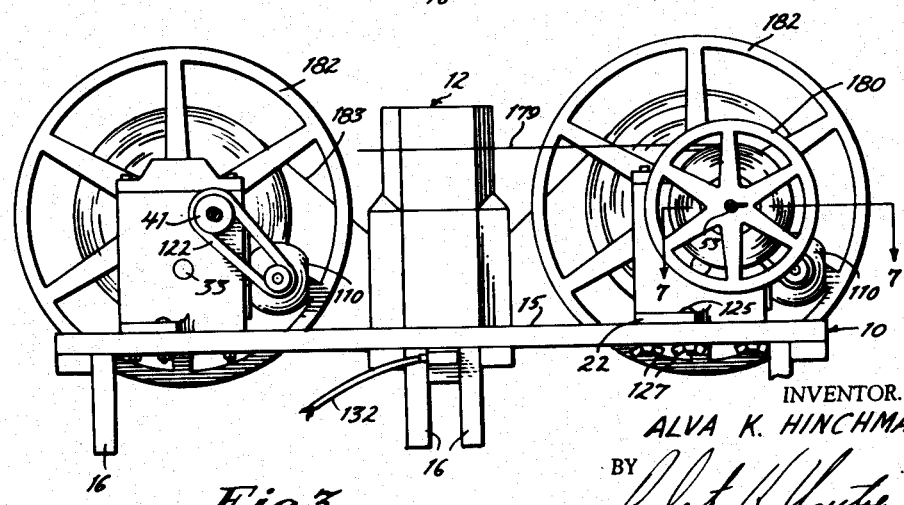
FIGURE 3 is a sectional elevational view taken substantially along the line 3—3 of FIGURE 1.

Referring now more particularly to the drawings, and specifically to FIGURES 1-3 thereof, the apparatus illustrated therein comprises generally a base 10, a pair of substantially identical units 11 mounted at spaced locations on the base, and an editing viewer and splicer 12 mounted on the base between the units 11.

More specifically, the base 10 may include a generally flat, normally horizontally disposed bed or table 15 of elongate rectangular configuration, provided with spaced legs 16 depending from its underside for engagement with an appropriate supporting surface. The editing viewer and splicer 12 may be conventional and is located generally medially of the elongate base plate 15. Further, the viewer and splicer 12 is arranged on the base plate 15 to face forward therefrom, as best seen in the front view of FIGURE 2. Suitable guide rolls 18 are provided on the viewer and splicer 12 for properly guiding film being edited. The editing viewer and splicer 12 may be mounted on the base 10, by any suitable means, for forward and rearward shifting movement or adjustment, in order to accommodate different size film with the rolls 18 in proper alignment with the film.

As both of the operating units 11 are substantially identical, a detailed description of one will suffice. The left-hand unit 11 in FIGURES 1 and 2 includes an upstanding hollow housing 20 of generally rectangular configuration and having front and rear bottom flanges 21 and 22 seated on the upper surface of the base plate 15 for securement thereto. Either one or both of the operating units 11 may be mounted on the base 10 for shifting movement or adjustment toward and away from each other and the viewer and splicer, so as to accommodate widely varying reel sizes. The housing 20 further includes generally vertically disposed, rectangularly arranged front, rear and side walls, and a cover or top 23 removably secured in position extending across the upper end of the front, rear and side walls. Projecting rearward from the rear housing wall is a generally horizontally disposed rear journal bearing 25, while a generally horizontally disposed front journal bearing 26 projects forward from the front housing wall in offset relation with respect to the rear journal bearing.

Located interiorly of the housing 20 is a speed-reduction gear train 28, best seen in FIGURES 5 and 6. It will there be noted that a shaft 30 is journaled in the bearing 25, extending forward into the housing 20 and rearward beyond the journal bearing. Keyed on the inner end of the shaft 30, interiorly of the housing 20, is a pinion 31. A relatively large spur gear 32 is arranged within the housing 20 in meshing engagement with the pinion 31 and rotatably mounted in the housing on a generally horizontally disposed, forwardly and rearwardly extending shaft 33 having its opposite ends journaled in the front and rear housing walls. Keyed to the shaft 33 for rotation with the relatively large gear 32 is a pinioin 34, which is located forward of the latter gear. An additional relatively large gear 35 is located interiorly of the housing 20 in meshing engagement with the pinion 34, and is carried by a shaft 36 which extends forward through and is journaled in the front-wall bearing 26. It will now be appreciated that the shaft 30 of the gear train 28 is the high-speed shaft, and that the shaft 36 is the low-speed shaft. In practice, a ratio between the shafts 30 and 36 of about 32 to 1 has been found satisfactory.

Circumposed about and keyed to the high speed shaft 30, as by screws 40, and located rearward of the journal bearing 25, is an open ended tubular coupling 41 formed in its external periphery, adjacent to its forward end, with an annular pulley groove 42. The outer or rearward end portion 43 of the tubular coupling 41 is of reduced diameter, both externally and internally. A pair of axially spaced antifriction bearings 44 and 45 are located interiorly of the rearward end portion 43 of the coupling 41, rotatably supporting or journaling an extension shaft or section 46 arranged in axial alignment with and projecting rearward from the high speed shaft 30.

Figure 9:
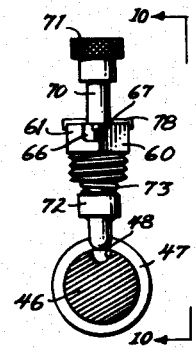
FIGURE 9 is a partial view similar to FIGURE 8, but showing a different operative condition of the elements.

The rearwardly projecting shaft or shaft section 46 has its forward portion received in the rearward portion 43 of coupling 41, there rotatably supported in the bearings 45, and formed in the region between the bearings with an annular external groove or opening 47. At a location along the groove 47, the shaft section 46 is formed with a recess 48 extending radially inward through the bottom wall or radially inner surface of the groove 47, to define a radially outwardlly opening hole, as best seen in FIGURE 9. The shaft section 46 exteriorly of the coupling 41 is preferably reduced, thereby defining a rearwardly facing, generally annular shoulder 50, and the reduced portion 51 may be of non-circular cross sectional configuration, extending rearward from the shoulder 50 and terminating in a rear end portion 52, which may be of circular cross section, if desired. The end portion 52 of shaft section 46 is formed with an end slot 53, as appears in FIGURE 3; and, a pivotal bar, latch or holding member 54 is mounted adjacent to on one of its ends in the end slot 53, as by a pivot pin 55.

Figure 10:
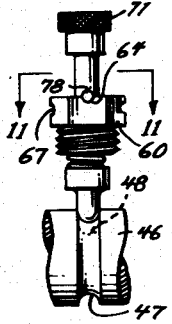
FIGURE 10 is a partial view showing the elements of FIGURE 9 in the condition thereof but in a plane at right angles thereto, as in the direction of the arrows 10—10 in FIGURE 9.

Formed in the rearward portion 43 of tubular member or coupling 41, located longitudinally between the bearings 44 and 45, is a radially extending through bore 58. That is, the bore or passageway 58 opens from the exterior of the coupling 41 radially inward to the shaft section 46. A bushing 60 is threadedly engaged in the radially outward portion of passageway 58, and includes an outer end enlargement or head 61 located exteriorly of the coupling portion 43. The bushing 60 is formed with a through opening or bore 62 having its radially inward end enlarged to define an annular radially inwardly facing shoulder 63. The outer end enlargement or head 61 is formed in its outer end with an outwardly facing groove 64 extending across the head intersecting with and opening into the outer end of bore 62. Further, the bushing head 60 is formed with a slot 65 extending across its outer end surface intersecting with and opening into the bore 62 and located in angularly displaced relation with respect to the groove 64. The slot 65 is appreciably deeper than the groove 64, as appears in FIGURES 9 and 10, and extends angularly in its lower region 66, spaced beneath the radially outer surface of the head 60, terminating in a radially outward undercut portion 67. Thus, the undercut groove portion 67 is located in angularly displaced relation with respect to the portion of groove 65 opening through the radially outward end surface of bushing head 60, for a purpose appearing presently.

Figure 7:
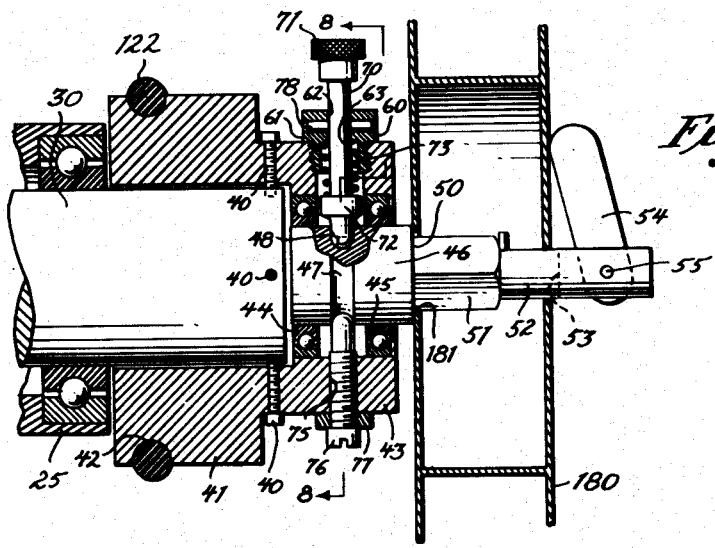
FIGURE 7 is a partial horizontal sectional view taken substantially along the line 7—7 of FIGURE 3.
Figure 11:
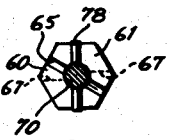
FIGURE 11 is a sectional view taken substantially along the line 11—11 of FIGURE 10.

A pin, rod, or shank 70 extends slidably through the bore 62 of bushing 60, being spacedly received in the inner enlarged end region of the bore, and disposed generally radially of the shaft section 46. The pin 70 has an enlarged head 71 on its radially outer end, outward of the bushing head 61, the pin head being preferably knurled to facilitate manual grasping. Adjacent to and spaced from the inner end of pin 70 is provided an external shoulder or collar 72, located in spaced relation between the bearings 44 and 45, as seen in FIGURE 7. The pin 70 is resiliently biased radially inward toward the shaft section 46 by any suitable resilient means, such as a coil compression spring 73 circumposed about the pin, located between and having its opposite ends in bearing engagement with the bushing shoulder 63 and pin collar 72. As is illustrated in FIGURES 7–10, the pin 70 is located in alignment with the groove 47 of shaft section 46, having its inner end receivable therein, and further having its inner end selectively receivable in the groove recess 48, as will appear presently in greater detail.

Located in the same radial plane of the rearward coupling portion 43 as the bore 58, and in angularly spaced relation thereabout, are a plurality of radially disposed, preferably internally threaded through holes 75, each opening from the exterior of the coupling portion 43 to the interior thereof between the bearings 44 and 45. Threadedly engaged in each of the holes 75 is a guide pin 76 having its inner end extending into the groove 47 and having its outer end provided with an adjustment head or nut 77. A cross member or rod 78 is carried by the pin 70 for selective movement therewith into one of the grooves 64 and 65.

Figure 8:
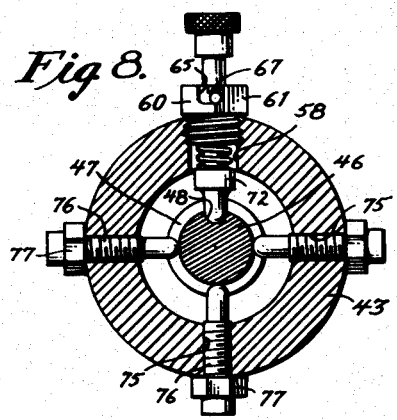
FIGURE 8 is a sectional elevational view taken substantially along the line 8—8 of FIGURE 7.

It will now be appreciated, from the foregoing description of coupling 41, and the elements carried thereby, that the coupling and its associated elements combine to define a clutch for releasably engaging and disengaging the high speed shaft 30 and its extension section 46. The extension section 46 is, of course, mounted by the bearings 44 and 45 of the coupling 41 for relative rotation axially of the high speed shaft 30. The guide pins 76 have their inner ends received in the groove 47 to retain the shaft section 46 against longitudinal movement relative to the shaft 30, while permitting relative axial rotation therebetween. In the radially outward position of pin 70, retracted out of recess 48 but having its inner received in groove 47, the latter pin also serves to prevent relative longitudinal movement of the shaft sections 30 and 46 while permitting relative axial rotation therebetween. However, upon inward shifting movement of the pin 70 to extend its inner end into the groove recess 48, the shaft sections 30 and 46 are positively coupled against relative rotation by the pin 70 and coupling 41. Insertion or extension of the inner end of pin 70 into the groove recess 48, as from the position of FIGURE 10 to that of FIGURE 8, is effected by manual radial outward movement of the pin to withdraw the cross member 78 from the groove 64, against the force of spring 73, and rotating the pin to align the cross member with the groove 65. Release of the pin 70 when the same is in alignment with the shaft recess 48, permits engagement of the inner pin end in the shaft recess and engagement of the cross member 78 in the relatively deep groove 65. Additional rotation of the pin 70 swings the cross member 78 through the groove portion 66 into substantial alignment with the cut-out portion 67. In this manner, the pin 70 is engaged in the recess 48, and its inadvertent removal therefrom is effectively prevented by the cut-out 67 which receives and prevents rotation of the cross member 78 should the pin attempt to jump out of the recess 48.

In FIGURES 12, 13, and 14 are illustrated a braking mechanism of friction clutch carried by each shaft extension 69 of the shaft 36. Stated otherwise, a projecting or terminal shaft section 80 is carried by each shaft extension 69 by means of a coupling portion 81 of the terminal shaft section; and, a friction clutch, braking or retarding means 82 is carried by the coupling portion 81 for mechanical interposition between the shaft section or extension 69 and the shaft section 80.

As best seen in FIGURE 12, the extension or shaft section 69 has its outer or projection end portion reduced, as at 84, and is there formed with a pair of external or outwardly facing, circumferential grooves 86 and 87, the latter being outward or forward of the former. The terminal shaft section 80 has its inner or coupling portion 81 formed with an axial bore 88 opening rearward or inward and rotatably receiving the reduced end portion 85 of shaft extension or section 69. Forward or outward of the coupling portion 81, the shaft section 80 is formed with a reduced, noncircular portion 90, defining on the coupling portion 81 a forwardly facing shoulder 91. The shaft section 80 is further reduced forward of the non-circular portion 90, as at 94, and there of circular cross-sectional configuration. The forwardmost portion 94 of shaft section 80 is formed with a diametral groove extending inward from its forward end, as at 89, and provided with a retaining member or arm having one end portion pivoted in the groove. The pivoted retaining arm is designated 92 and operated in the same manner as retaining arm 54 described hereinbefore, to releasably hold a film reel on the shaft section 80. A radial pin 93 projects from the circular end portion 94 of shaft section 80 adjacent to the medial, noncircular shaft portion 90, for nonrotating interengagement with certain types of film reels.

As thus far described, the shaft sections 80 and 69 are axially rotatable relative to each other. However, the braking mechanism 82 serves to control such relative axial rotation. The braking mechanism 82, best seen in FIGURE 13, is mounted in a radial through opening 95 of the coupling portion 81, communicating between the interior bore thereof 88 and the exterior thereof, and includes an internally and externally threaded bushing 96 disposed radially of the coupling portion 81 and in threaded engagement in the bore or hole 95. As appears in FIGURE 12, the coupling-portion bore 95 and the bushing 96 are in alignment with the groove 87 radially of the shaft section 69. A headed screw or carrier element 97 has its shank formed with an internal bore or hollow 98 which opens through the shank end remote from the shank-end enlargement or head 99. In assembly, the shank of screw or carrier 97 extends radially inward in threaded engagement in the bushing 96 having its internal bore opening toward the groove 87 of shaft section 45.

A braking element or shoe 100 is received in the groove 87 of shaft section 69, in bearing engagement with the bottom wall of the groove, and is provided with a pin or shank 101 projecting radially outward with respect to the shaft section having its outer end entering in spaced relation into the bore 98 of screw 97. The pin 101 of brake shoe 100 is in substantial alignment with the shank of screw 97. A coil compression spring 102 has one end portion circumposed about the pin 101 of brake shoe 100, in bearing engagement with the latter, and has its other end portion received in and bearing against the end wall of the bore 98. Thus, the resilient means or spring 102 yieldably maintains the shoe 100 in its bearing engagement with the bottom wall of groove 87; and, the proportions of the pin 100, spring 102 and bore 98 are selected so that the shoe and pin 100, 101, will be maintained in substantial alignment with the screw 97 during relative rotation of the shaft portion 85 and coupling portion 81. The brake shoe 100 may be fabricated of any suitable braking material, such as leather, fiber or soft metal, or the like. The force of braking action by the shoe 100 against the bottom wall of groove 87 is, of course, adjustable by adjusting the screw 97 radially of the shaft section 69 in the bushing 96.

While the shoe 100 is slidably and conformably received in the groove 87, and maintained in alignment with the screw 97, to effectively prevent relative longitudinal movement of the coupling portion 81 and shaft portion 85, it may be desirable to provide additional means limiting the coupling portion 81 and shaft section 69 to relative axial rotation. Such a construction is illustrated in FIGURE 14, wherein a pair of aligned, diametrically opposed threaded members or pins 105 extend in threaded engagement through the coupling portion 81 into the inner or rearward groove 86. Engagement of the inner ends of pins 105 in the groove 86 effectively limits or prevents relative longitudinal movement of the shaft sections 80 and 69, without deterring relative axial rotation thereof. Nuts 106 may be provided on the outer ends of the pins 105 to positively lock the latter in their adjusted position of radial movement.

On one vertical side wall of the housing 20, the left-hand side wall as seen in FIGURES 1 and 2, is mounted an electric motor or other suitable drive means 110. The motor extends generally horizontally, having its drive shaft 111 projecting rearward and provided with a drive pulley 112.

Figure 4:
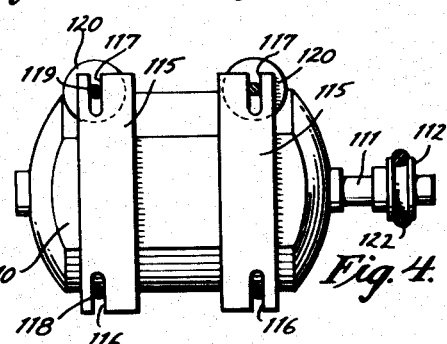
FIGURE 4 is a sectional elevational view taken substantially along the line 4—4 of FIGURE 2.

In order to mount the motor 110 on the housing 20, a pair of generally vertically disposed plates 115 are fixedly secured to the motor and disposed in bearing engagement with the external surface of the adjacent housing side wall. As best seen in FIGURE 4, the plates 115 are each provided with a pair of vertically spaced, vertically extending slots or cutouts, the lower one being designated 116 and the upper one 117. A headed fastener, pin or screw 118 extends through each lower slot 116 into the adjacent housing wall for securement therein; and, an additional headed pin, fastener or screw 119 extends through each of the upper-plate slots 117 in threaded engagement into the adjacent housing wall. The fasteners 119 are preferably provided with relatively large heads 120 for manual rotation thereof. By this mounting arrangement, the fasteners 119 may be withdrawn slightly from the adjacent housing wall to permit vertical shifting movement of the motor 110, the fasteners being slidably received in their respective slots; and, the motor may be locked in any selected position of vertical movement by securement of the fasteners 119 to clamp the fastener heads 120 firmly against the respective plates 115. A flexible endless belt 122 is trained over the motor drive pulley 112 and the adjacent coupling 41 in its pulley groove 42 to drive the adjacent gear train 28. By the above-described adjustable mounting means, the tension on the belt 122 may be adjusted to any desired value.

As thus far described, the units 11 may be substantially identical, so that reference numerals designate like parts in the right-hand unit 11 of FIGURES 1 and 2.

By way of difference, the motors 110 of the right- and left-hand units 11 are preferably wound for energized rotation in opposite directions, the left-hand motor rotating counterclockwise and the right-hand motor rotating clockwise, as viewed from the front. Further, by way of difference in the units 11, at least one of such units is preferably mounted on the base 10 for adjustable positioning toward and away from the other unit. Hence, the left-hand unit 10 is provided with fasteners 125 extending through the flanges 21 and 22, and thence through elongate slots 126 in the base plate 15, on the other side of which they are provided with wing nuts 127. The left-hand unit 11 is therefore adjustably positionable toward and away from the right-hand unit 11.

In FIGURE 1 is also shown a treadle, generally designated 130, connected in circuit with a supply line 131 adapted for connection to a power source, and a cord or electrical line 132 connected to the motors 110 through a switch 133.

Figure 15:
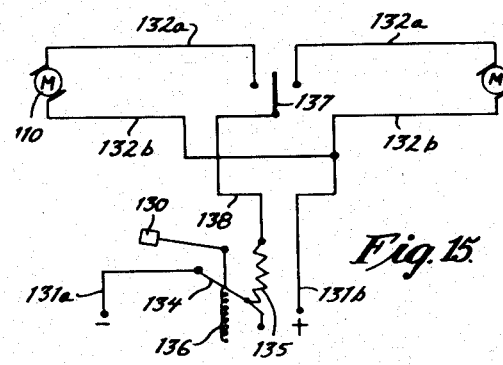
FIGURE 15 is a diagrammatic representation of the electrical system of the instant invention.

The electrical circuit is illustrated in FIGURE 15, wherein the supply-line conductors are designated 131a and 131b, the former being connected through a swingable arm 134 to a variable rheostat 135 of the treadle 130. The rheostat arm 134 is biased, as by a spring 136 to its illustrated position and movable by actuation of the treadle. Extending from the treadle rheostat 135 is a conductor 138 which terminates in a double-throw switch 137. A conductor 132a extends from each terminal of the switch 137 to one side of a respective motor 110, and conductors 132b extend from the other sides of the motors, respectively, to the supply line 131b. Hence, the switch 137 has three positions, namely (1) the open-circuit intermediate position illustrated, (2) a leftward position closing a circuit through the left-hand motor, and (3) a rightward position closing a circuit through the right-hand motor. When either of the motor circuits is closed, the associated motor may be operated by actuation of the treadle 130.

An optional or alternate drive mechanism is generally designated 140 in FIGURES 16 and 17. The drive mechanism 140 is adapted for manual actuation and shown, for purposes of illustration, as mounted on the projecting section 46 of shaft 30. More specifically, the manual drive means 140 includes a crank arm 141 arranged outward of the rearward portion 52 of shaft section 46 and disposed generally radially of the shaft section. Secured on one end of the crank arm 141 is a socket 142 extending generally transversely of the crank arm, being fixed to the latter by fasteners 143, and formed with a generally circular recess or bore 144 having its outer end open for the conforming reception of shaft portion 52. Further, the transverse socket 142 is formed with a slot extending inward from the distal end of the socket, disposed diametrically with respect to the socket bore 144 and opening exteriorly on opposite sides of the socket for receiving the retaining arm or latch 54. Thus, the socket 142 is nonrotatably engaged on the projecting end portion 52 of shaft section 46 by its reception of latch 54 in groove or slot 145. On the radially outward end of crank arm 141 is provided a knob or handle 146 disposed generally normal to the crank arm and pivotally connected thereto, as by a pin 147.

In FIGURES 1-3 it will be noted that a film reel 180 is mounted on the high-speed shaft section 46 of each unit 11. This is best seen in FIGURE 7, wherein the film reel 180 is formed with a noncircular central aperture 181 conformably receiving the noncircular portion 51 of the shaft section 46. The reels 80 may each be removed from and replaced upon their shaft sections 46 by swinging the respective holding member, arm or latch 54 to a position in alignment with its shaft section. Additional swinging of the latch 54 to its illustrated position of FIGURE 7 serves to retain the film reel 180 fixed on its shaft section. A motion-picture film 179 is illustrated as extending between and having opposite end portions coiled about the respective reels 180.

The function of the reels 180 is to effect rapid winding of the film 179 from one reel to the other. As the reels 180 are mounted on the sections 46 of high-speed shafts 30, it is obvious that high-speed winding will be accomplished by energizing the motors 110 as described hereinbefore. That is, the motor 110 which is associated with the particular reel 180 upon which it is desired to wind the film is energized. As the reel 180 upon which it is desired to wind the film is driven from its associated motor 110 at substantially constant speed, or at a speed determined by the operator, it will be appreciated that the other reel 180 from which the film is being unwound will necessarily have an angular velocity which varies with respect to that of the winding reel dependent upon the relative sizes of film coils on the respective reels. In order to accommodate for this variation in relative angular velocity of the reels 180 and their supporting sections 46, the clutch means or pin 70 of the unwinding reel carrying shaft section 46 may be withdrawn or disengaged from the latter, to permit free wheeling of the undwinding reel 180. If desired, the clutch means may remain engaged and the gear train of the unit 11 associated with the unwinding reel may drag to provide a quick stopping or braking action of the unwinding reel.

Mounted on the shaft sections 80 of the low-speed shafts 36, in substantially the same manner as described hereinbefore in connection with the reels 180, are a pair of reels 182. Thus, the reels 182 are each mounted for rotation with its respective low-speed shaft. A film 183 to be edited extends between the reels 182, through the editor 12, and has its opposite end portions coiled about the respective reels 182. Obviously, the film 183 will pass relatively showly from one reel to the other upon energization of one of the motors 110; and of course, movement of the film may be reversed by energization of the other motor, as described hereinbefore in connection with FIGURE 8. Further, movement of the film 183 may be selectively stopped without the development of undue slack in the film by deactuation of the driving motor. Of course, the actuating motor may be deactuated by opening of the switch 137, or by appropriate operation of the treadle 130. More specifically, stoppage and/or reversal of the film 183 may be accomplished by mere operation of the electrical circuit without the development of excess slack or stress in the film. This result is achieved by the impositive or frictional connection of each reel 182 with its associated gear train and driving motor by the respective braking means 82.

When it is desired to effect relatively slow movement of film between reels, and accurately control the speed and position of film, it may be desirable to employ the hand drive means 140 of FIGURES 16 and 17. Here again, the frictional connection afforded by the braking means 82 effectively prevents the formation of undue slack and tension in the film.

From the foregoing, it is seen that the present invention provides a device for editing and winding motion-picture film which fully accomplishes its intended objects and is well adapted to meet practical conditions of manufacture and use.

In the slightly modified embodiment of FIGURE 18, the threaded pins 105a are substituted for the threaded pins 105 of FIGURE 14. The pins 105a carry a pair of inwardly extending spaced legs 105b, and a roller or disc 105c is rotatably supported between the legs 105b of each pin 105a, as by a pivot 105d extending between each pair of legs and through its associated roller.

It will now be appreciated that the high and low speed shafts 30 and 36 of each gear train or unit 11 are each provided with selectively actuable clutch means, the former being characterized by the structure within coupling 41, and the latter by the structure within coupling portion 81. Hence, a selected one of the high speed shafts and a slected one of the low speed shafts may be coupled to the associated gear train to be driven by the latter, and the other of the high and low speed shafts uncoupled or disengaged for free rotation relative to their associated gear trains. This, of course, affords a high degree of versatility and changeability in use, to meet a wide range of operating desiderata. Further, the clutch mechanism contained in the coupling 81 may be operated as a brake, by frictional engagement of the shoe 100 insufficiently to effect positive coupling. This serves to prevent excessive rotation of the shaft section 80 at a rate faster than desired. Of course, if desirable, the friction-type clutch of coupling 81 may be employed in the coupling 41.

Figure 19:
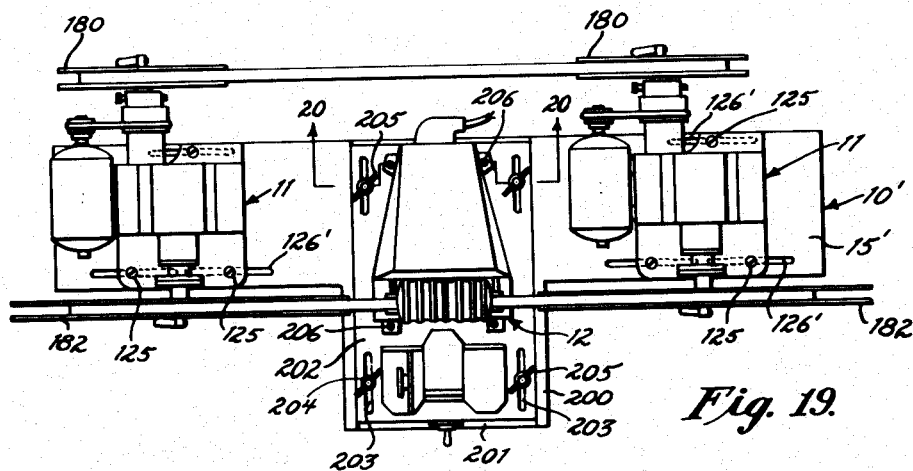
FIGURE 19 is a top plan view similar to FIGURE 1, but showing a slightly modified embodiment of the device of the present invention.
Figure 20:
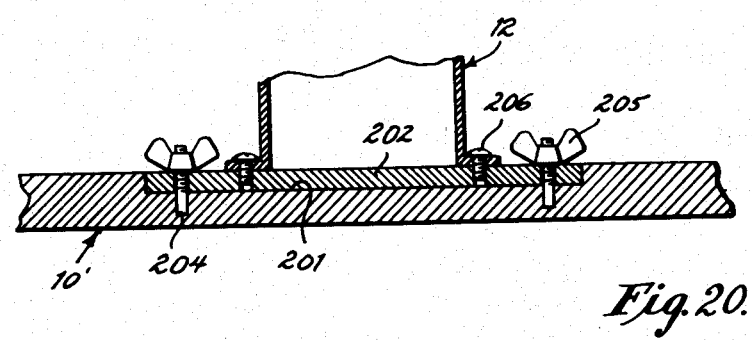
FIGURE 20 is a partial sectional elevational view taken substantially along the line 20—20 of FIGURE 19.

In the embodiment of FIGURES 19 and 20 a slightly modified base 10' carries a pair of gear train units 11 at spaced locations on the base, and an editing viewer and splicer 12 is mounted on the base between the units 11. The gear train units 11 and the viewer and splicer 12 may be substantially the same as the correspondingly numbered elements described hereinbefore.

The base 10' may include a normally horizontally disposed, elongate bed or table 15' which is provided centrally with a forwardly extending, generally coplanar base portion 200. Beneath each of the gear train units 11 the base plate 15' is formed with a plurality of elongate through slots 126', all extending longitudinally of base plate, and being of substantial length. The base plate slots 126' are each adapted to receive a fastener 125, such as that of the first described embodiment, slidable along its respective slot 126' and adapted to releasably clamp the associated gear train unit in position on the base plate 15'. Thus, the pair of gear train units 11 are adjustably mounted for movement toward and away from each other on the base 10', being selectively positionable in a desired fixed relation on the base, whereby the pair of film reels 180 on the rear side of the base, as well as the pair of film reels 182 on the front side of the base, are adjustably positionable toward and away from each, to enable the accommodation of a wide variety of film reel sizes without undue space between the reels of each co-operating pair.

The base 10' is further provided with a centrally located, upwardly facing slideway or groove 201 formed in the upper side of the forward base plate extension 200 and the adjacent rearward portion of the base plate. More specifically, the upwardly facing groove, slideway or track 201 extends generally normal to the longitudinal direction of the base plate 15', opening through the rearward side of the latter, and through the forward or front edge of the front extension 200.

A generally flat, approximately rectangular mounting plate 202 is slideably seated in the track or groove 201, preferably having its upper surface flush with the continuous upper surface regions of the base plate 15'. The mounting plate 202 is thus slideable in the track or groove 201 in a direction transverse of or normal to that of the longitudinal dimension of the base plate. Formed in the mounting plate 202 at spaced locations therein, say the corners thereof, are elongate, through slots 203, all disposed longitudinally of the track 201. A pin 204 projects upward from the bottom surface of the track or groove 201 through and beyond each of the slots 203, having its upwardly projecting portion externally threaded for purposes appearing presently. The pins 204 are fixed by any suitable means to the base plate 15' and its forward extension 200, and received in the slots 203 for limiting engagement with the ends of the respective slot upon forward and rearward shifting movement of the mounting plate 202. Suitable clamping elements, such as winged nuts 205 are threaded on the upper ends of the pins 204 for releaseable clamping engagement with the upper surface of the mounting plate 202, to selectively fixed the latter in exact position of its shifting movement.

The editing viewer and splicer 12 may be of any conventional type and is mounted on the upper surface of the plate 202, as by fasteners 206, or other suitable securing means.

It will now be appreciated that the plate 202 adjustably mounts the editor 12 for movement and selective positioning along a path generally normal to the longitudinal dimension of the base 10'. By this means, an editor may be selectively positioned forwardly and rearwardly with respect to the base 10' to facilitate the accomodation of different sizes and types of film and film reels; and, the adjustment of mounting plate 202 enables the device to be employed with a wide variety of different type editors without major alteration, to satisfy the desires of all users.

Although the present invention has been described in some detail by way of illustration and example for purposes of clarity of understanding, it is understood that certain changes and modifications may be made within the spirit of the invention and scope of the appended claims.

What is claimed is:

1. In a motion-picture film winder and editor, a base, a pair of spaced reduction gear trains on said base each having a high speed shaft projecting on one side and a low speed shaft projecting on the other side, means for driving a selected one of said gear trains, means for mounting a film reel on each of said low speed and high speed shafts for rotation therewith, and selectively engageable and disengageable clutch means interposed between the projecting end of each of said shafts and its associated gear train, whereby a selected one of said high speed shafts and a selected one of said low speed shafts may each have its projecting end coupled to its respective gear train to be driven thereby and the other of said high and low speed shafts may have its projecting end disengaged from the associated gear train for free rotation relative to the latter, said low speed shafts each being of sectional construction having a pair of aligned relatively rotatable sections, and clutch means in said low speed shafts operatively connecting the sections of each low speed shaft for allowing variations in speed between said film-reel mounting means as required by changing relative sizes of film coils on said reels, said clutch means in said low speed shafts each comprising a brake element mounted on one section of the respective low speed shaft for movement radially inward and outward, respectively, into and out of frictional engagement with the other section of the respective low speed shaft, said other section of each low speed shaft being formed with an external circumferential groove removably comfortably receiving its respective brake element, and resilient means urging said brake elements radially inward into said frictional engagement, said resilient means being of sufficient force to retain said brake elements in said frictional engagement and to relieve said frictional engagement upon a predetermined tension in film being wound and upon a predetermined angular velocity under the centrifugal force of said brake elements.

2. A motion-picture film winder and editor according to claim 1, the clutch means in said high-speed shafts each comprising a coupling connecting together aligned sections of the respective high-speed shaft for relative axial rotation of the high-speed-shaft sections, one section of each high-speed shaft being formed with an external annular groove having a radially inwardly extending recess, and a pin mounted in said coupling for rotation with the other section of each high-speed shaft and shiftable radially of the latter between an extended position having one end in said annular groove permitting relative axial rotation between the high-speed-shaft sections and a retracted position having one end in said recess to couple the high-speed-shaft sections against relative rotation, resilient means engaging said pin and urging the latter toward its retracted position, said resilient means being of a strength to release said pin upon overload on a film being wound, and means for releasably holding said pin in its extended position.

3. In a motion-picture film winder and editor, a base, a pair of spaced reduction gear trains on said base each having a high speed shaft projecting on one side and a low speed shaft projecting on the other side, means for driving a selected one of said gear trains, means for mounting a film reel on each of said low speed and high speed shafts for rotation therewith, selectively engageable and disengageable clutch means interposed between the projecting end of each of said shafts and its associated gear train, whereby a selected one of said high speed shafts and a selected one of said low speed shafts may each have its projecting end coupled to its respective gear train to be driven thereby and the other of said high and low speed shafts may have its projecting end disengaged from the associated gear train for free rotation relative to the latter, said low speed shafts each being of sectional construction having a pair of aligned relatively rotatable sections, the clutch means in said low speed shafts operatively connecting the sections of each low speed shaft for allowing variations in speed between said film-reel mounting means as required by changing relative sizes of film coils on said reels, said clutch means in said low speed shafts each comprising a brake element mounted on one section of the respective low speed shaft for movement radially inward and outward, respectively, into and out of frictional engagement with the other section of the respective low speed shaft, and resilient means urging said brake elements radially inward into said frictional engagement, said resilient means being of sufficient force to retain said brake elements in said frictional engagement and to relieve said frictional engagement upon a predetermined tension in film being wound and upon a predetermined angular velocity under the centrifugal force of said brake elements, and a reel-retaining arm pivotally connected to the projecting end of each of said high and low speed shafts for rotation about an axis transverse of the respective shaft between a reel-retaining position transverse of the respective shaft and a reel-releasing position in alignment with the respective shaft, and a manually actuable drive crank having an end socket adapted to removably engage about the projecting end of a selected one of said shafts, said socket being formed with a transverse through slot adapted to receive a film-reel retaining arm when said socket is engaged about a projecting shaft end and the adjacent film-reel retaining arm is in its transverse position, said received retaining arm serving to retain said socket nonrotatably on the adjacent projecting shaft end for manual rotation of the latter by turning of said crank.

References Cited in the file of this patent

UNITED STATES PATENTS

| | | |
|---|---|---|
| 716,857 | Boivin | Dec. 30, 1902 |
| 1,641,405 | Wittel | Sept. 6, 1927 |
| 1,734,142 | McLaughlin et al. | Nov. 5, 1929 |
| 1,844,676 | Owens | Feb. 9, 1932 |
| 1,873,341 | Serrurier | Aug. 23, 1932 |
| 2,099,299 | Fritts | Nov. 16, 1937 |
| 2,280,727 | Stechbart | Apr. 21, 1942 |
| 2,372,192 | Fassel | Mar. 27, 1945 |
| 2,463,728 | Wallin | Mar. 8, 1949 |
| 2,604,271 | Moomaw | July 22, 1952 |
| 2,679,180 | Baia | May 25, 1954 |
| 2,885,487 | Rivas | May 5, 1959 |
| 2,946,531 | Hinchman | July 26, 1960 |